US007209977B2

(12) United States Patent
Acharya et al.

(10) Patent No.: US 7,209,977 B2
(45) Date of Patent: Apr. 24, 2007

(54) METHOD AND APPARATUS FOR CONTENT-AWARE WEB SWITCHING

(75) Inventors: Arup Acharya, Westwood, NJ (US); Anees A. Shaikh, Yorktown Heights, NY (US); Renu Tewari, San Jose, CA (US); Dinesh C. Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 09/968,127

(22) Filed: Oct. 1, 2001

(65) Prior Publication Data
US 2003/0065711 A1 Apr. 3, 2003

(51) Int. Cl.
*G06F 15/173* (2006.01)
*H04L 12/28* (2006.01)
*H04L 12/56* (2006.01)
(52) U.S. Cl. ............... 709/240; 370/395.3; 709/249
(58) Field of Classification Search ............ 709/203, 709/227–229, 238–244, 249; 370/389, 400, 370/395.3
See application file for complete search history.

(56) References Cited

U.S. PATENT DOCUMENTS

| | | | |
|---|---|---|---|
| 6,205,488 B1 * | 3/2001 | Casey et al. | 709/238 |
| 6,330,605 B1 * | 12/2001 | Christensen et al. | 709/226 |
| 6,374,303 B1 * | 4/2002 | Armitage et al. | 709/242 |
| 6,483,833 B1 * | 11/2002 | Jagannath et al. | 370/392 |
| 6,567,857 B1 * | 5/2003 | Gupta et al. | 709/238 |
| 6,611,872 B1 * | 8/2003 | McCanne | 709/238 |
| 6,628,654 B1 * | 9/2003 | Albert et al. | 370/389 |
| 6,697,361 B2 * | 2/2004 | Fredette et al. | 370/389 |
| 6,731,639 B1 * | 5/2004 | Ors et al. | 370/395.51 |
| 6,771,662 B1 * | 8/2004 | Miki et al. | 370/469 |
| 2002/0009079 A1 * | 1/2002 | Jungck et al. | 370/389 |
| 2002/0016911 A1 * | 2/2002 | Chawla et al. | 713/153 |
| 2002/0048269 A1 * | 4/2002 | Hong et al. | 370/389 |
| 2002/0065938 A1 * | 5/2002 | Jungck et al. | 709/246 |
| 2002/0110087 A1 * | 8/2002 | Zelig et al. | 370/236 |
| 2002/0172155 A1 * | 11/2002 | Kasvand-Harris et al. | 370/229 |
| 2003/0061356 A1 * | 3/2003 | Jason | 709/227 |

OTHER PUBLICATIONS

Rosen, E. et al. "Request for Comments (RFC) 3031: Multiprotocol Label Switching Architecture", published by Network Workin Group, Jan. 2001, 61 pages.*
The Apache Software Foundation. "Apache module mod_proxy", Apache HTTP Server Documentation Version 1.3, publicly posted Dec. 5, 2000, <http://web.archive.org/web/20001205100400/http://httpd.apache.org/docs/mod/mod_proxy.html>, 1 pages.*

* cited by examiner

*Primary Examiner*—David Wiley
*Assistant Examiner*—George C. Neurauter, Jr.
(74) *Attorney, Agent, or Firm*—Louis P. Herzberg

(57) ABSTRACT

This invention provides methods and apparatus for web switching without connection termination while providing content routing functionality. Content-aware web switches terminate incoming TCP connections and inspect the HTTP header to recognize the URL (content) being requested from a web server farm. This invention maps application layer information (URLs) to MPLS labels. This allows a standard MPLS switch to provide web switching functionality without terminating TCP connections. In addition to content routing, this method is applied for client session affinity, server load balancing and service differentiation. This invention also relates to using TCP port numbers instead of MPLS labels to achieve web-switching functionality through the use of a TCP router that translates IP address and port numbers.

53 Claims, 14 Drawing Sheets

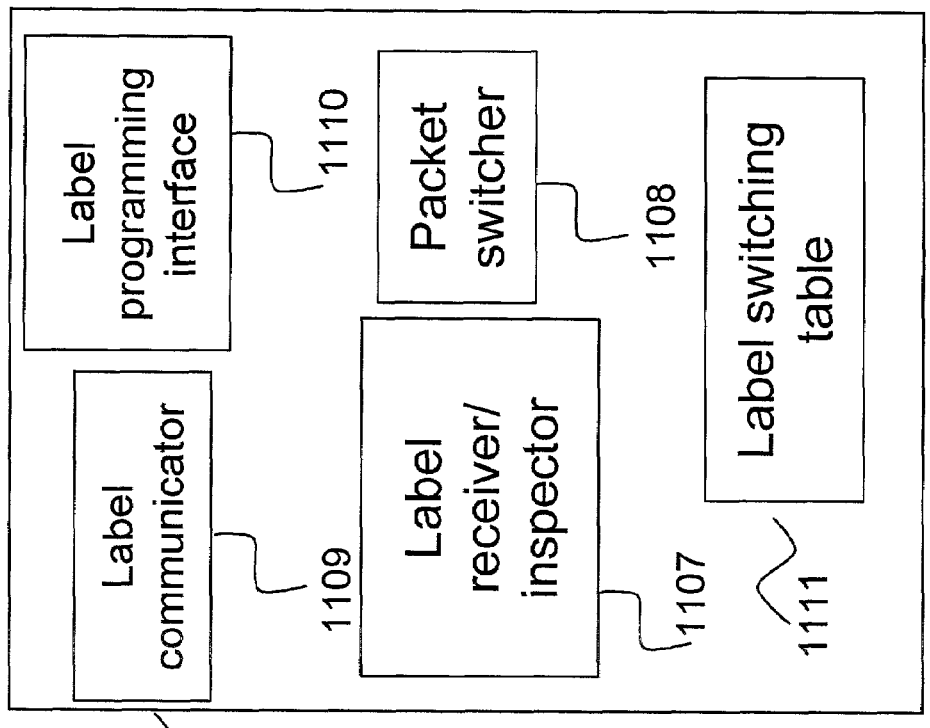
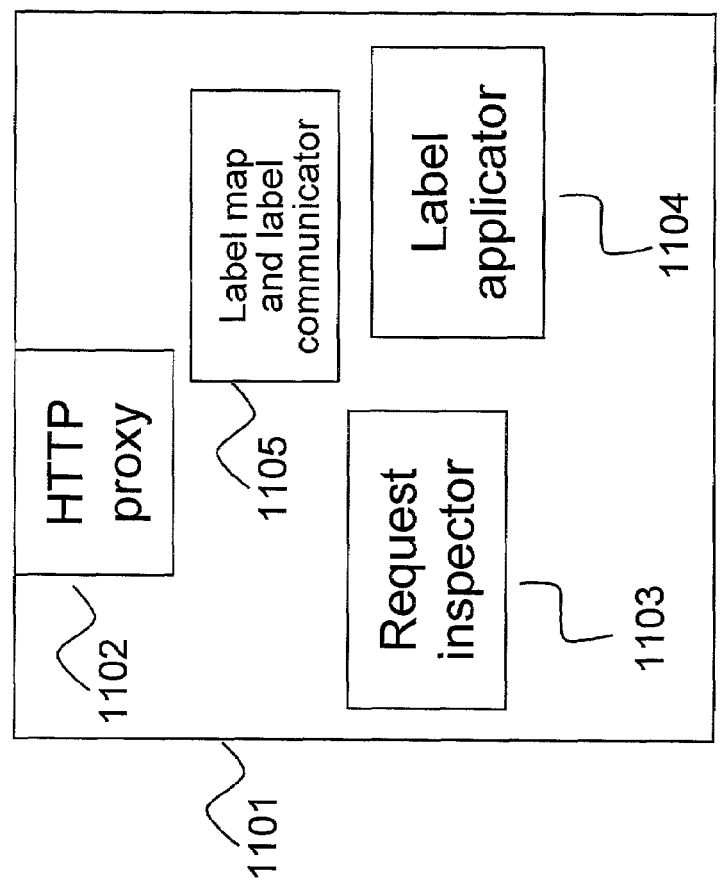
Fig. 11b
Fig. 11a

METHOD AND APPARATUS FOR CONTENT-AWARE WEB SWITCHING

FIELD OF THE INVENTION

This invention is directed to the field of computer networks. It is more particularly directed to forward and reverse web-proxies and web-switching devices.

BACKGROUND OF THE INVENTION

Current high-volume, high-availability, content distribution networks use clusters of Web servers to achieve scalability and reliability. To serve a large and diverse client population, content can be replicated across servers, or partitioned with a dedicated server for particular content or clients. In such environments a front-end dispatcher (usually called a "web switch" or a "reverse proxy" based on its functional usage) directs incoming client requests to one of the server machines. The request-routing decision can be based on a number of criteria, including requested content, server load, client request, or client identity.

Dispatchers are typically required to perform several functions related to the routing decision. These include:
  distribute incoming requests as to balance the load across servers;
  examine client requests to determine which server is appropriate to handle the request (i.e., content-based routing);
  identify the client to maintain affinity with a particular server for e-business applications or to provide service differentiation.

Dispatchers may be broadly categorized into two types: layer-4 dispatchers which base decisions on TCP and IP headers alone, and layer-7 dispatchers which use application layer information (e.g., HTTP headers) to direct clients. The use of layer-4 or layer-7 dispatchers depends on the request-routing goal. Load-balancing across replicated content servers, for example, typically does not require knowledge of the client request or identity, and thus is well-suited to a layer-4 approach. Content-based routing requires the dispatcher to terminate the incoming connection, examine the higher-layer headers, and either create a new connection with the appropriate server (using connection splicing), or transfer the connection to the appropriate server (using connection handoff). Layer-7 dispatchers, while more sophisticated, suffer from limitations on scalability and performance since they must perform connection termination and management for a large number of clients.

High-speed switching hardware is also commonplace in core ISP networks with a growing migration to Multiprotocol Label Switching (MPLS). MPLS provides a circuit-switching service in a hop-by-hop routed network and is presently used for flexible routing, traffic engineering and Virtual Private Networks (VPNs). It achieves this by grouping related packets by assigning them a common, fixed-size label. Packets sharing a label belong to the same forwarding equivalence class (FEC) and can be routed and treated the same way in the network. Standard usage of MPLS involves establishment of arbitrary label-switched paths (LSPs) for forwarding particular classes of traffic. LSPs may also be nested by stacking MPLS labels where an outer label might be used to assign traffic to a common network-wide path, while an inner label could be used to demultiplex traffic among classes of traffic on that path. An MPLS-enabled network includes of label-switched routers(LSRs) that implement the MPLS protocols.

MPLS labels do not have built-in semantics, i.e. labels are used only to map a packet from an LSR input port to an LSR output port. It would be advantageous to make use of this flexibility by mapping application-layer information onto labels to enable high-performance Web switching, rather than using labels to express routing and forwarding policies (as is customary).

SUMMARY OF THE INVENTION

It is thus an aspect of the present invention to map application-layer information onto labels to enable high-performance Web switching.

Another aspect of the present invention, is to use TCP port numbers as labels and use a Network Address Translator (NAT) as the dispatcher for request routing.

Still another aspect of the present invention is to provide methods and apparatus for content-aware web switching by using MPLS labels without terminating transport layer connections.

In an alternative embodiment, TCP port numbers are used analogously to MPLS labels for the case when the network is not MPLS-enabled to perform content-aware web switching without terminating transport layer connections.

Other aspects and a better understanding of the invention may be realized by referring to the detailed description.

DESCRIPTION OF THE DRAWINGS

These and other aspects, features, and advantages of the present invention will become apparent upon further consideration of the following detailed description of the invention when read in conjunction with the drawing figures, in which:

FIGS. 11a and 11b are block diagrams showing example structures of forward and reverse proxies, respectively, that implement the proposed solution for content-aware web switching using MPLS labels.

DESCRIPTION OF THE INVENTION

The present invention provides methods and apparatus for efficient routing of web requests at a network dispatcher in front of a web server farm, where Web requests refer to HTTP requests sent by clients and the corresponding HTTP response sent by servers back to clients. In the first embodiment of our invention, we leverage the growing migration of networks to Multiprotocol Label Switching (MPLS). MPLS heretofore provides a circuit-switching service in a hop-by-hop routed network and is typically used today for flexible routing, traffic engineering and Virtual Private Networks (VPNs). It achieves this by grouping related packets by assigning them a common, fixed-size label. Packets sharing a label belong to the same forwarding equivalence class (FEC) and can be routed and treated the same way in the network. Standard usage of MPLS involves establishment of arbitrary label-switched paths (LSPs) for forwarding particular classes of traffic. LSPs may also be nested by stacking MPLS labels where an outer label might be used to assign traffic to a common network-wide path, while an inner label could be used to demultiplex traffic among classes of traffic on that path. An MPLS-enabled network includes of label-switched routers(LSRs) that implement the MPLS protocols. However, MPLS labels do not have built-in semantics, i.e. labels are used only to map a packet from an LSR input port to an LSR output port. The first embodiment of our invention takes advantage of this flexibility by mapping application-layer information onto labels to enable high-performance Web switching, rather than using labels to express routing and forwarding policies (as is customary).

In an alternative embodiment of our invention, we use TCP port numbers as labels and use a Network Address Translator (NAT) as the dispatcher for request routing. This is useful in cases where the core network is not MPLS enabled. The TCP port number in the TCP/IP packet header is used instead of an MPLS label for the purposes of making request routing decision at the network dispatcher. NAT, as described in RFC 1631, is a router function that translates the incoming and outgoing IP addresses and port numbers using a mapping table. NAT was originally proposed to increase the IP address space by allowing servers to re-use the addresses within a private address space and use the NAT to map to a unique public address. In this embodiment, the intervening network includes of IP routers which route packets based on IP headers (unlike MPLS labels in the previous method). Using NAT at the dispatcher the TCP port number can be translated into the IP address of the desired server.

Figure 1A:
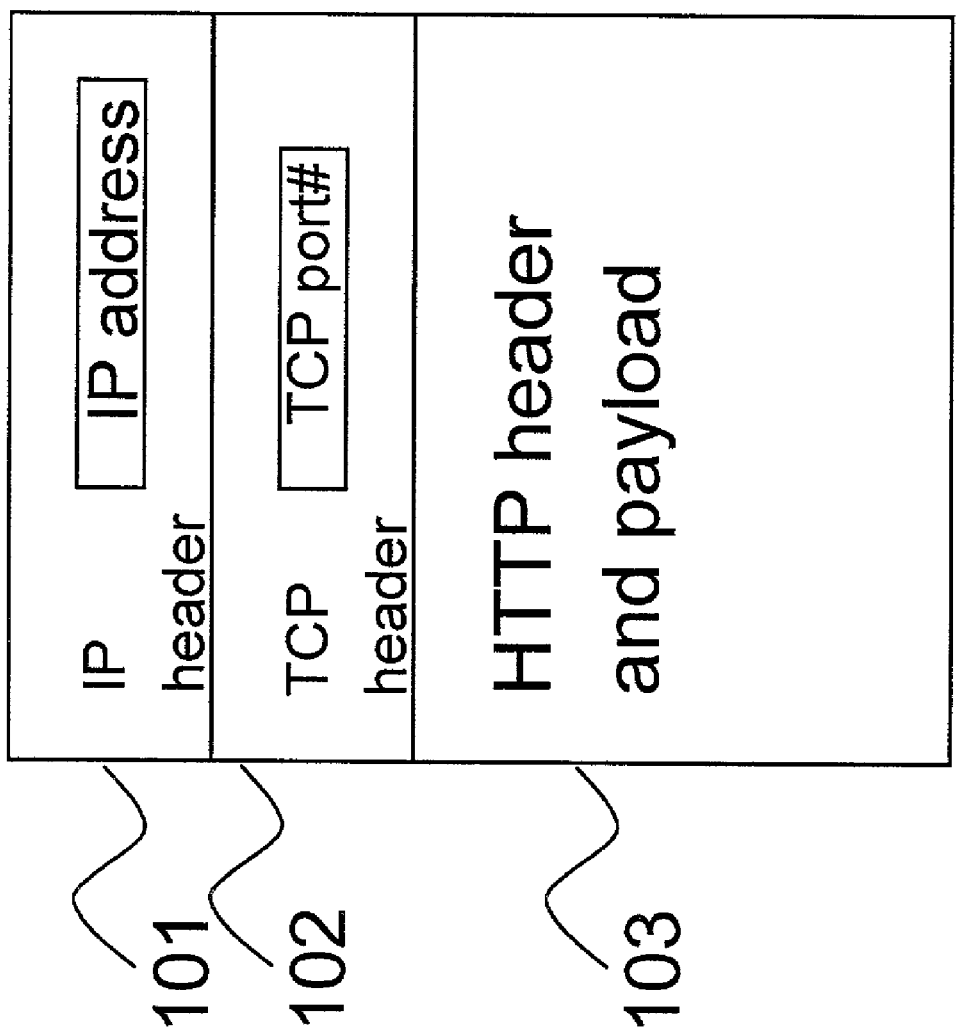
FIGS. 1*a*–1*c* are diagrams that show the packet format of standard IP packets, packets with MPLS labels, and MPLS packets that also include a content label as described in our invention.

FIG. 1a shows a non-MPLS packet that includes the IP and TCP headers (101 and 102, respectively) and the HTTP data payload (103). The TCP header includes, in particular, a port number that, with the IP address, uniquely identfies the connection at the reverse proxy. Content-aware web switching requires that the HTTP header be examined before a switching decision is made but this information is typically not available at the reverse proxy until a TCP connection is established.

Figure 1B:
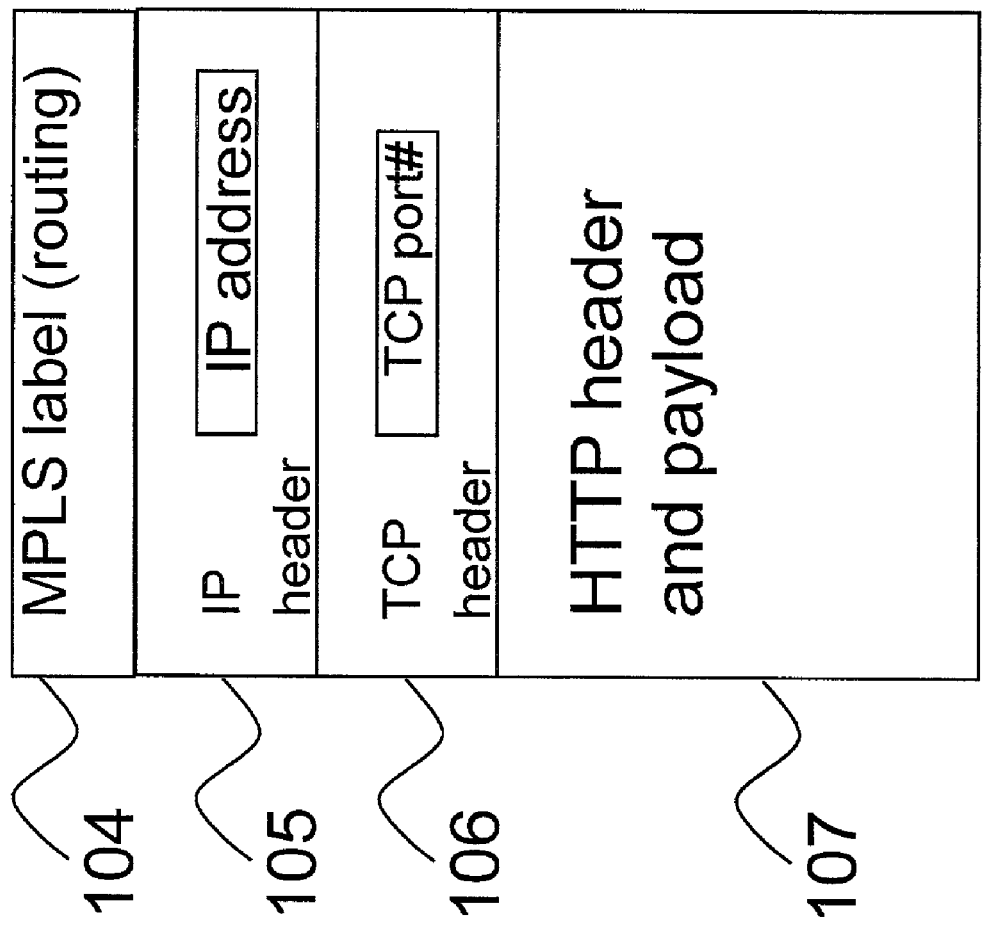

In standard usage of MPLS, the packet format is as shown in FIG. 1b. In addition to the headers in FIG. 1a, the packet also contains an MPLS label (104) that is used for routing and forwarding in the MPLS-enabled network. The other protocol headers and data (105–107) remain unchanged.

Figure 1C:
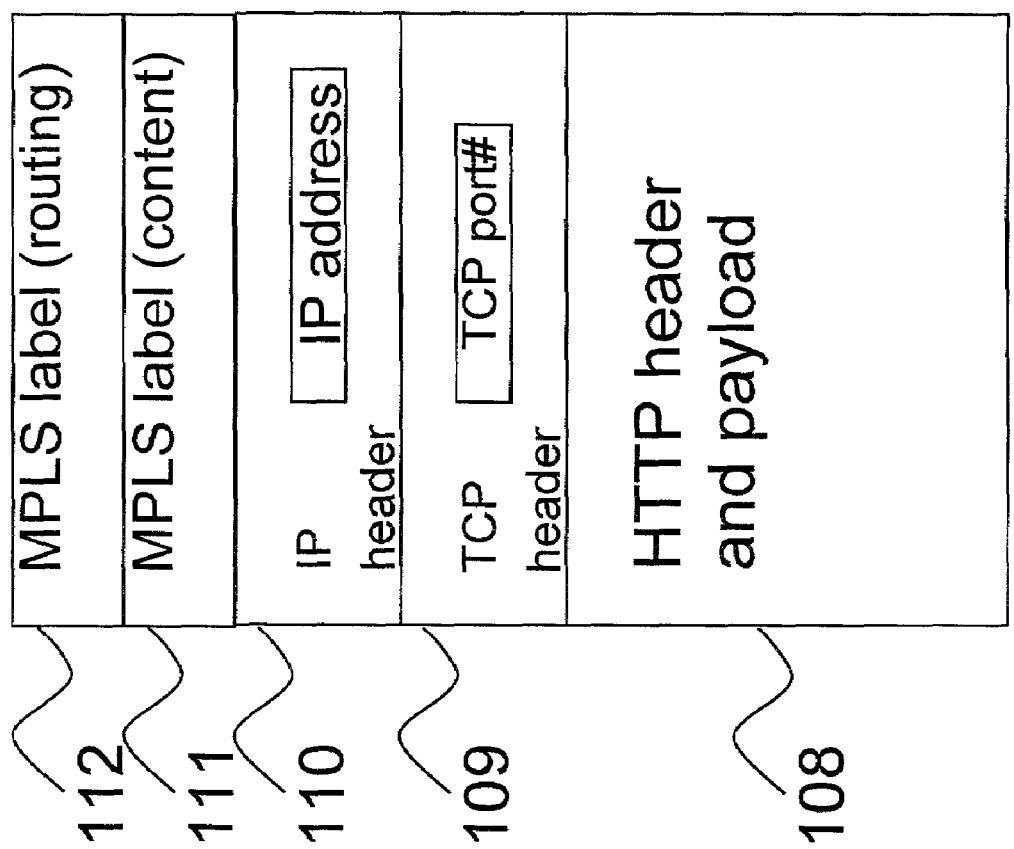

In this invention we add an additional MPLS label (111) to encode application-layer information, including information about the content being requested, as shown in FIG. 1c. This label is added to the packet behind the routing label (112) using the label-stacking feature of MPLS. The routing label and other protocol headers remain unchanged. Details of how the content label is applied to the packet and how it is used for content-aware web switching are described below.

Figure 1D:
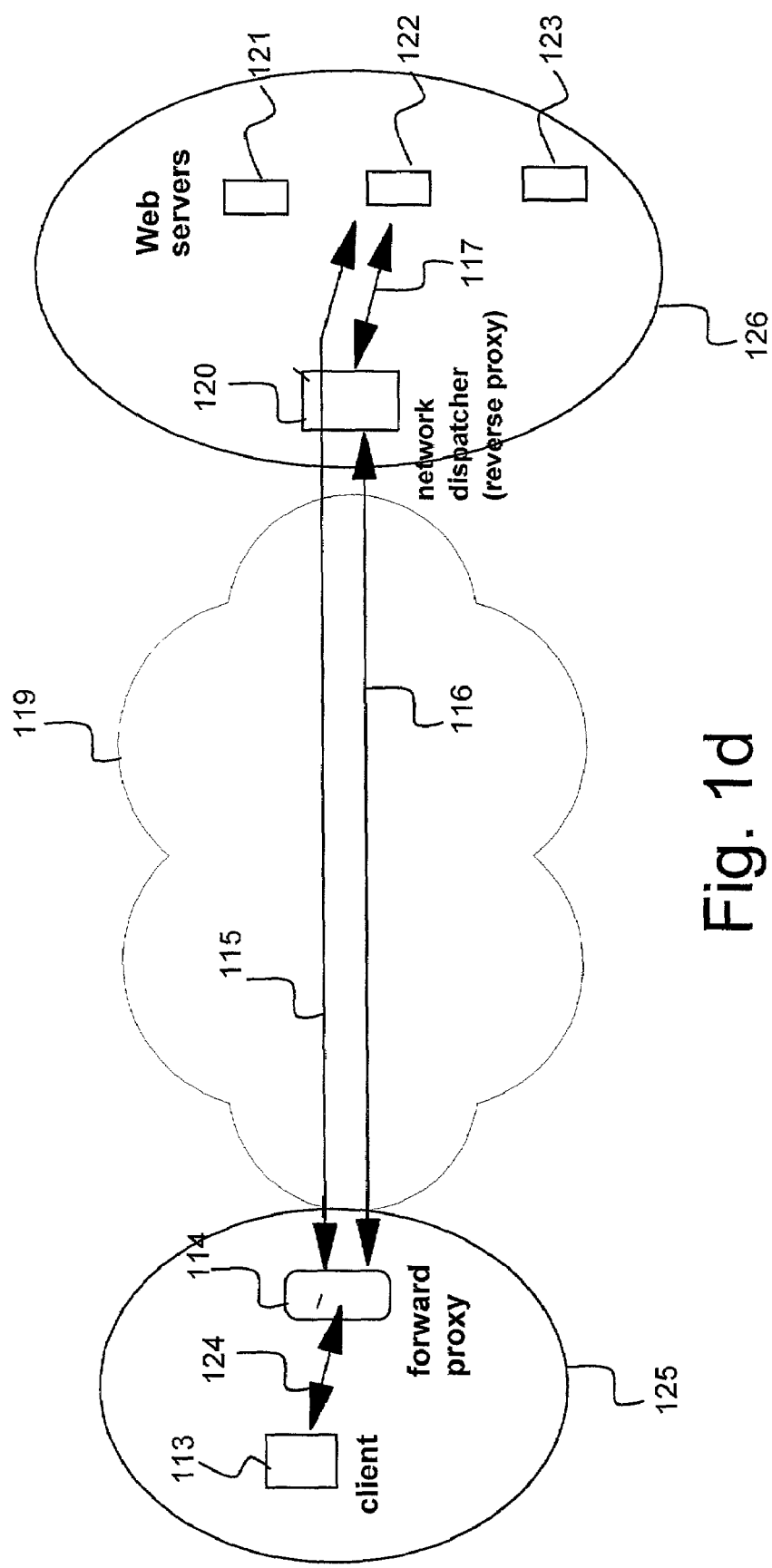
FIG. 1*d* is a diagram that shows the overall network architecture, which includes of client-side forward proxy, a core network, a reverse proxy (also called a dispatcher), along with clients and servers.

As shown in FIG. 1d, the basic network architecture includes of a core network 119, a enterprise network 125 and a server farm network 126 including of servers 121, 122 and 123. All web requests from clients such as 113 within the enterprise are handled by a forward proxy 114. Here, an enterprise network refers to any group of clients sharing a forward proxy. A forward proxy typically accepts HTTP requests from the clients and makes its own request to the Web server on the clients' behalf, often performing some additional function such as caching or request filtering. A TCP connection 124 is set-up between the client and the forward proxy on which HTTP requests (web requests) are sent. The proxy inspects the content being requested based on the URL (Uniform Resource Locator) of the HTTP request, and then sets up a TCP/HTTP connection with the appropriate server. The TCP/HTTP connection refers to an HTTP request/response payload carried over the TCP transport-layer protocol connection. Depending on the organisation of content in the server farm 126, the forward proxy may either set-up a direct TCP/HTTP connection 115 with the server 122, or two separate connections 116 and 117 may be set-up: one between the two proxies and the other between the reverse proxy and the server. The latter approach is used for content routing requests, i.e. when the client request has to be routed to a specific server serving the requested content. In this case, the TCP/HTTP connection requested from the forward proxy is terminated at the reverse proxy, the requested URL is inspected by the reverse proxy and based on that URL, the reverse proxy sets up a separate connection to the appropriate server (122 in FIG. 1). The output of connection of 117 is then transferred by the reverse proxy to the forward proxy via connection 116. The bottleneck in this case is the number of TCP/HTTP connections that the reverse proxy can terminate and the overhead of copying application (web pages) layer data between the two connections.

Figure 2:
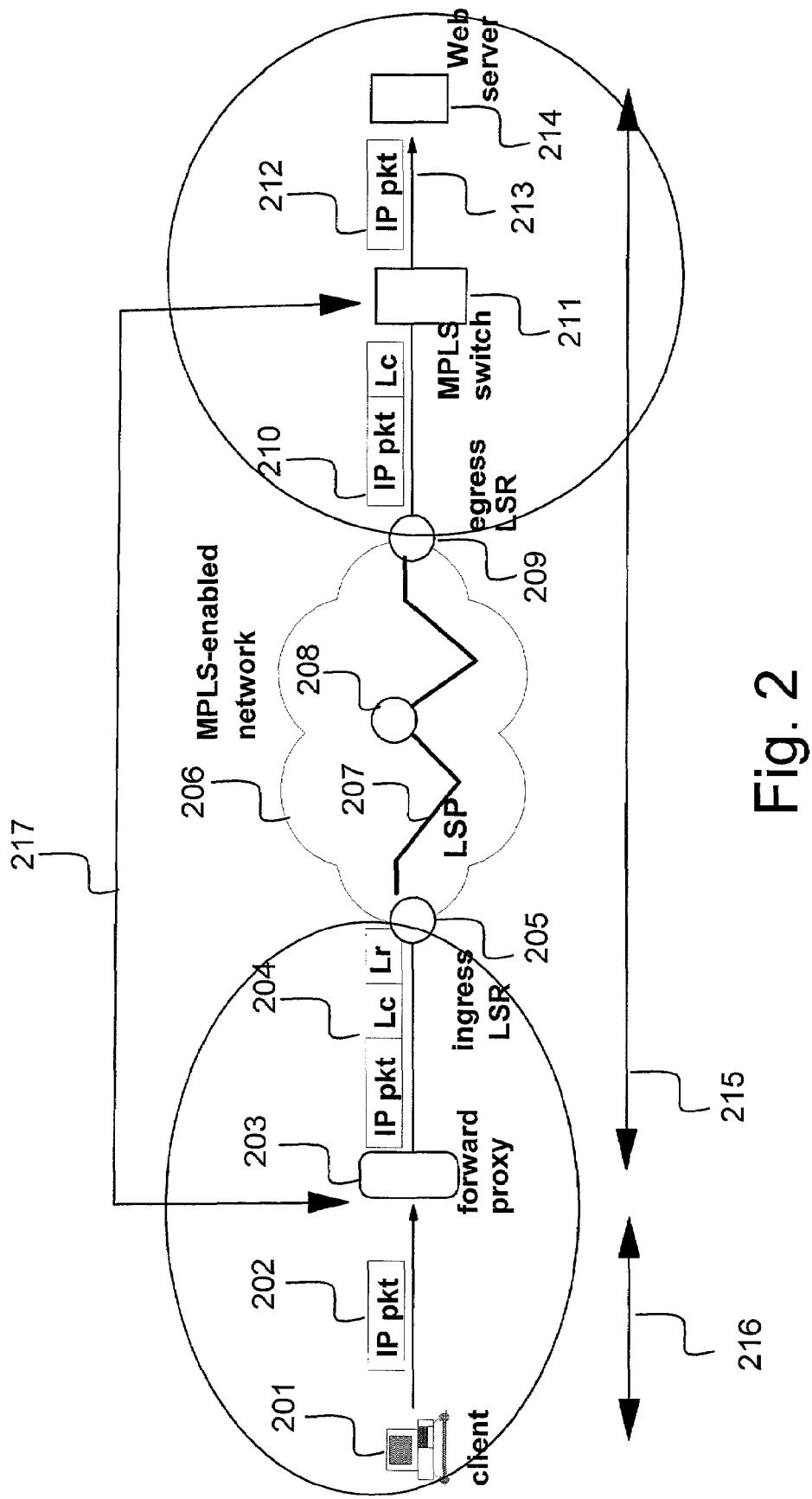
FIG. 2 is a diagram that shows an example of the components of the MPLS-based Web switching architecture detailing how the label-stacking feature of MPLS is used to apply application-layer labels for the purposes of Web switching. In this case the server network is the traditional IP network.

FIG. 2 describes the basic idea of our first embodiment. The core network 206 is now assumed to be MPLS enabled includes of Label Switching Routers (LSRs) such as 205, 208 and 209. A Label switched Path (LSP) is a sequence of hop-by-hop labels where at each LSR, the label of the incoming packet is used to index into a routing table that provides the next hop that the packet should be forwarded on, as well as the label to be applied to the packet on the outgoing link replacing the incoming label. This label replacement operation and table lookup based on a fixed-length label lends itself to very efficient hardware implementation. FIG. 2 shows an example of a LSP (207) within the core MPLS network traversing the LSRs 205, 208 and 209. The basic idea of our first method is to label packets belonging to a specific web connections such that the network dispatcher function can now be implemented by a standard MPLS switch 211 thereby avoiding the need for TCP termination at the dispatcher, in that it identifies requested content which is otherwise identified after terminating the TCP/HTTP connection.

The forward proxy 203 is responsible for mapping labels onto packets belonging to client connections. Typically in enterprise networks that are served by a forward proxy, the proxy terminates all web connections from clients within the enterprise. In this case, the connection 216 from the client 201 is terminated at the forward proxy 203, and this connection includes of standard IP packets (for example, the packet 202). The proxy then inspects the URL of the content being requested and sets up a connection 215 with the server by assigning a label specific to the URL to all packets constituting the connection 215. In FIG. 2, label used for this purpose is LC, which is used at the dispatcher 211 to choose which server 214 should handle the request. This is achieved by using a standard MPLS switch as a dispatcher 211 instead of terminating the connection (as was the case in FIG. 1*d*). MPLS allows multiple labels to be stacked on a packet and the packet routing decision is based on the outer label. The inner label(s) are independent of any outer labels used to route the request through the network. When the MPLS-aware forward proxy 203 makes a corresponding connection to the server 214, it pushes an appropriate label (LC) onto the label stack. It then places another label (LR) onto the label stack to facilitate routing through the MPLS network. The packet with an inner (content) label LC and an outer (routing) label LR is shown in FIG. 2 as item 204. Based on the outer label LR, the packet is routed within the MPLS network through the LSP 207 from the ingress LSR 205 to the egress (209) of the MPLS core network. During this process, the outer label LR will be replaced by appropriate routing labels at each intervening LSR such as 208. At the egress LSR 209, the outer routing label is finally popped (and no further routing label is inserted) thus leaving LC as the outer label. Item 210 shows the MPLS header for the packet at this stage. The network dispatcher 211, which is now a standard MPLS LSR, inspects the label LC and routes the packet to the server 214 after stripping the label LC. If the network link between the dispatcher and the servers is not MPLS enabled, then, if the servers are directly connected to the dispatcher through common physical network such as ethernet the packet can be sent using the MAC (Medium access control)/layer-2 address of server 214. Alternatively, there exists tunneling techniques such as L2TP or IP-in-IP for forwarding the packets to the server over a multi-hop network. The key point is that the decision to route the packet to the appropriate server can be made without terminating the TCP/HTTP connection at the network dispatcher (see items 116 and 117 in FIG. 1*d*) and instead a direct connection 215 can be established between the forward proxy 203 and the appropriate web server 214.

Figure 3:
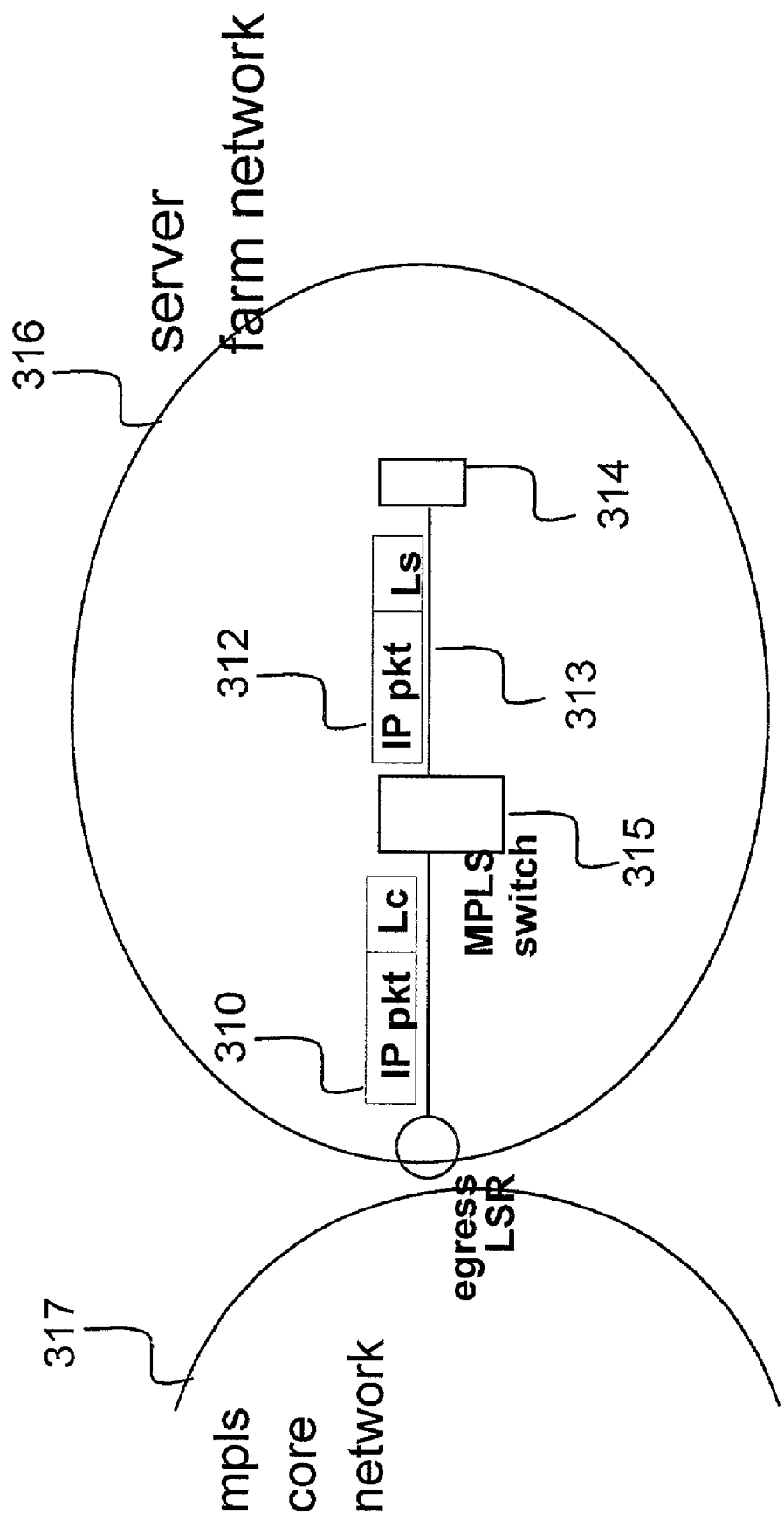
FIG. 3 is a diagram that shows an example of how MPLS-based web switching can be used end-to-end when the server network is MPLS enabled.

As shown in FIG. 3, if the server network 316 is MPLS-enabled, the dispatcher 315 can further switch the packet 310 on the link 313 to the server 314 by replacing the label LC with the label LS on the link 313, all the way to the server. The resulting packet structure on link 313 is shown in item 312.

The mapping of client connections to labels is communicated by the dispatcher to the forward proxy using a persistent control connection. In FIG. 2, this is shown as the connection 217 between the dispatcher and the forward proxy. The dispatcher maintains persistent connections with each of the MPLS-enabled proxies accessing the server (e.g., using HTTP). The dispatcher directs the proxy to insert labels according to some policy, depending on the functionality required.

FIGS. 4–9 provide details of the functions performed by the forward proxy and the dispatcher when a new request is received to facilitate the request-routing functions. Depending on the mapping, the dispatcher can support a variety of functions without having to terminate TCP connections:

content-based routing
client-server affinity
client-specific service differentiation
server load balancing Content-based routing is useful when content is partitioned across the server cluster such that only a subset of servers can respond to a given request. In this case the proxy assigns a label based on the content being requested.

Figure 4:
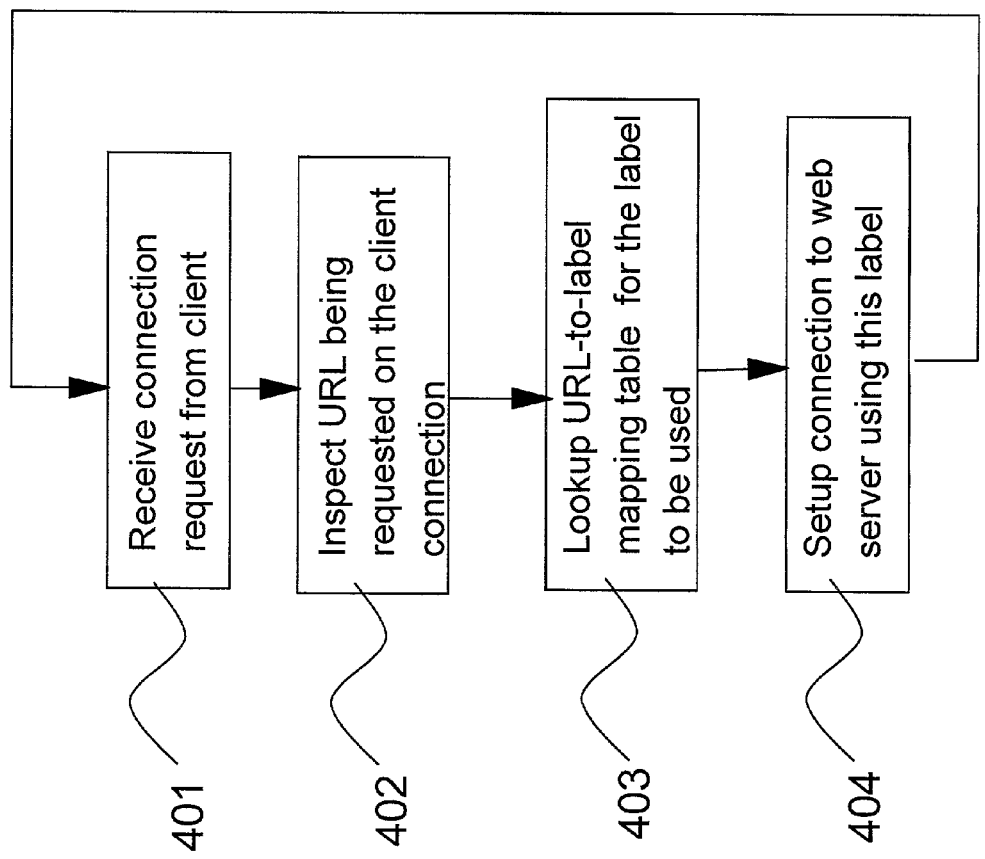
FIG. 4 is a block diagram that delineates the steps taken by the forward proxy in mapping labels onto packets belonging to client connections.

FIG. 4 describes the steps used for using labels to enable content routing. The forward proxy first receives a TCP/HTTP connection from a client in step 401, inspects the HTTP header (URL) for the content being requested (step 402) and then inspects its URL to label mapping table for the label matching the requested content (step 403). It then sets up a connection to the web server and uses this label on all packets constituting the said connection.

The proxy populates its URL-to-label mapping table based on what it receives from the dispatcher. The dispatcher can provide the request-to-label mappings in a number of ways, depending on how much flexibility is required. One mechanism is to distribute the labels along with a hash function to the proxy. The proxy can apply the hash function to the URL being requested to determine which label to use. In practice it may be sufficient to divide content among servers in a coarser fashion. For example if content is partitioned based on directory paths, the dispatcher could send (path, label) pairs such as <(/, L1),(/pc, L2),(/linux, L3)> to the proxy. FIG. 4 describes the steps used for using labels to enable content routing.

Another possibility is to serve Web pages with hyperlinks that encode labels based on the URL. For example the first request for http://www.example.com/index.html could be served from any Web server, using a default label. But the links on the index.html page could be transformed into a form like http://www.example.com/<image_content_label>/image.gif. The forward proxy, on seeing such a URL, could strip the label from the URL and insert it in the request packets. The dispatcher then switches the request to the appropriate server.

Figure 5:
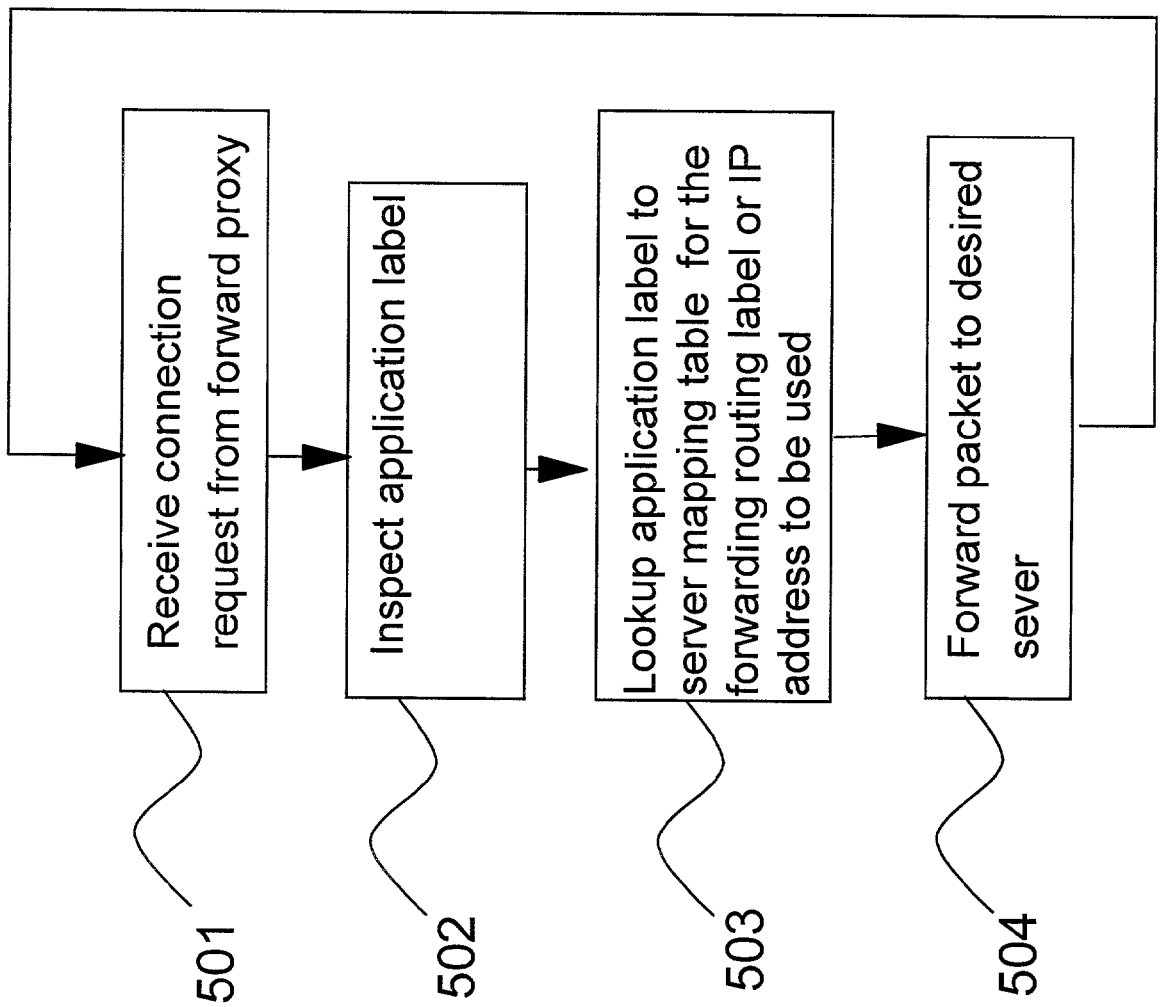
FIG. 5 is a block diagram that delineates the steps taken by the MPLS-based dispatcher in using the application-layer label to choose the appropriate server.

FIG. 5 describes the steps used for the dispatcher in using labels to perform content routing. The dispatcher first receives a TCP/HTTP connection from the forward proxy in step 501, inspects the application label (step 502) and then looks up the label mapping table for the new routing label for a server or the server IP address (step 503). It then forward the packets constituting the said connection to the said server (step 504).

Figure 6:
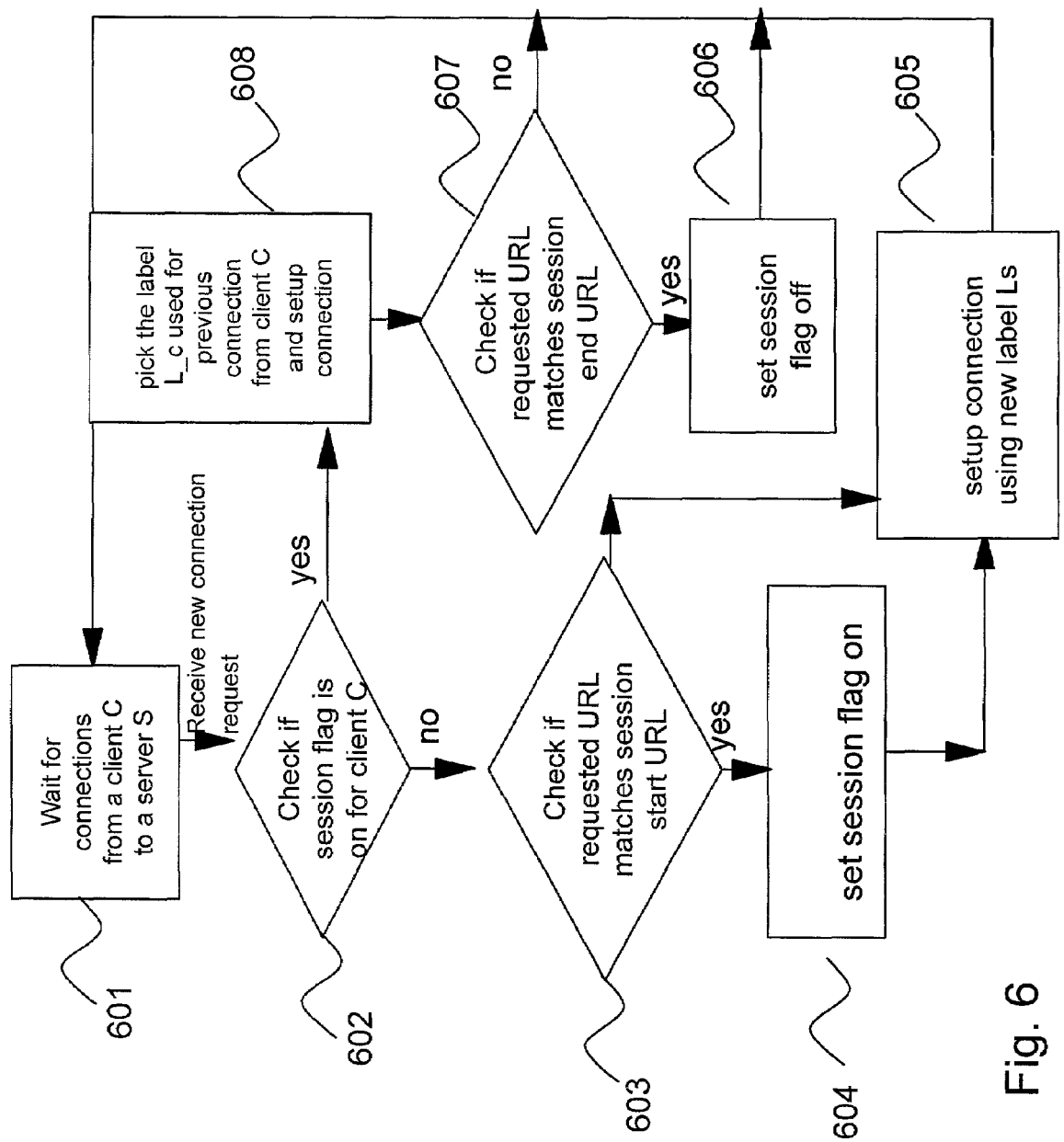
FIG. 6 is a diagram that shows an example of a components of a Web switching architecture that uses encoded TCP port numbers for the purposes of Web switching in a traditional IP network.
Figure 7:
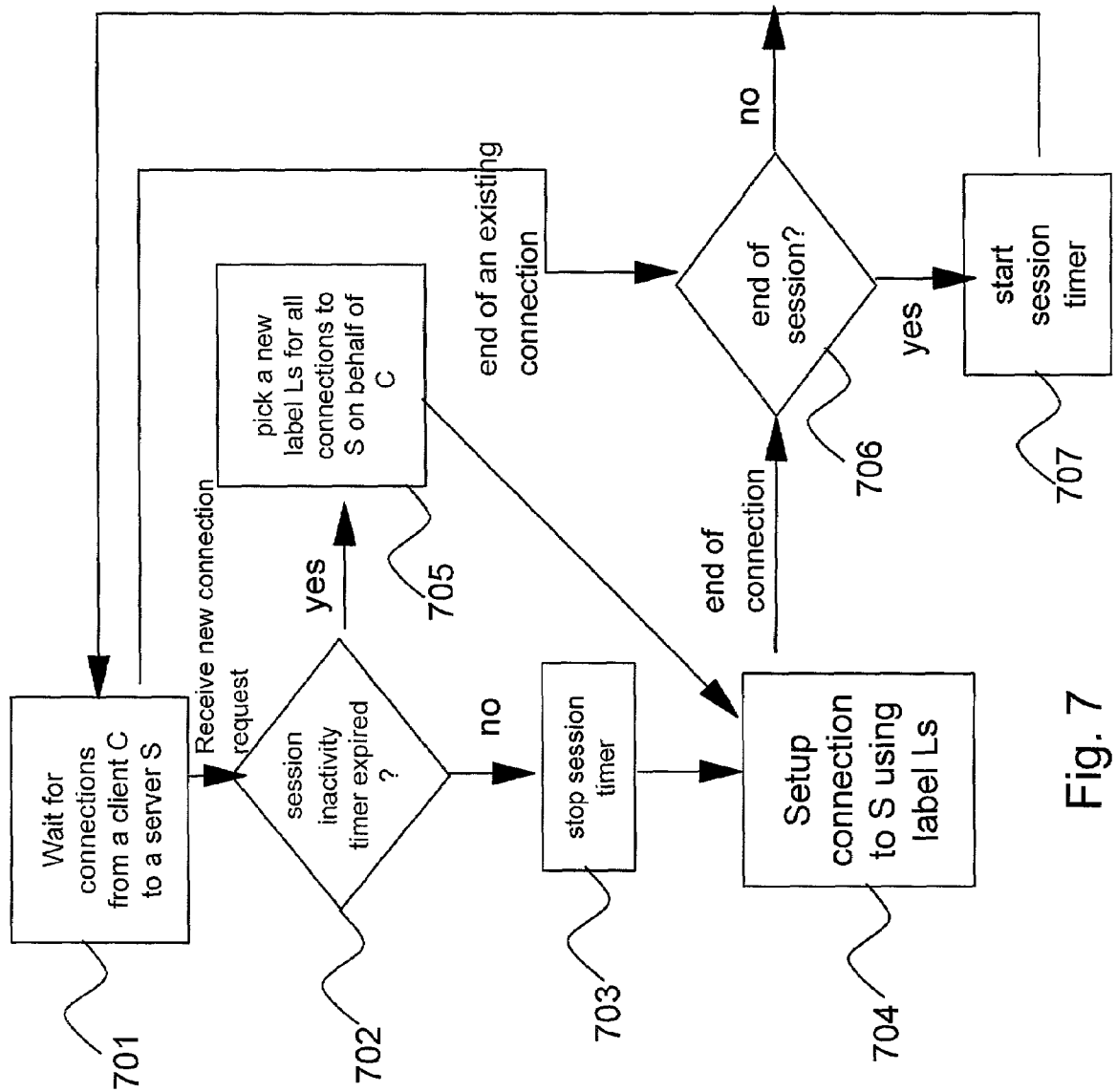
FIG. 7 is a block diagram that delineates the steps taken by the forward proxy in mapping labels to connections while maintaining affinity based on explicit start and stop URLs.

FIGS. 6 and 7 show an example of how the forward proxy uses the labels received from the network dispatcher according to a Client Affinity criterion. In e-business applications a single transaction may include of multiple requests and responses (each of which is a web request) before the transaction (session) is completed. Once a client is directed to a particular server where some session state is established, it is desirable to direct the client to the same server for the duration of the session. In this case, the label attached by the proxy is used to identify which server earlier serviced the client for the ongoing session. To handle persistence, the proxy assigns the same label (from a set of labels provided by the dispatcher) to a given client for the duration of a session. In this case a client will always use the same label and be directed to the same server. We describe two mechanisms to detect a new session: (i) using explicit start and stop URLs to marks session, and (ii) a session inactivity timer that marks the beginning of a new session if the duration between new connection requests exceeds the expected time interval.

As shown in FIG. 6, the (forward) proxy initially waits to receive connection requests from a client C (step 601). When a connection request is received, it first checks whether this is part of an ongoing session between the client-server pair C and S. This is determined by checking a session on flag (step 602). If the flag is not set, then if the requesting URL matches the start URL of a session a new session is started (step 603) by picking a new label LS for this session (from the pool of labels sent by the dispatcher for the server S). If a session is ongoing, a label Lc is used that has already been allocated to this session (step 608). Since a new session has just started, the session flag is set (step 604). The proxy then sets up the connection to the server S using new label LS (step 605). When a connection completes, the proxy checks if the requested URL matched the stop URL (step 607) then the proxy resets the session flag (step 606) and resumes waiting for a new connection (step 601). The start and stop URLs that indicate the session boundaries are communicated at setup time to the proxy by the dispatcher.

Our second approach to handle client affinity is via session inactivity timers. In an example shown in FIG. 7, the (forward) proxy initially waits to receive connection requests from a client C (step 701). When a connection request is received, it first checks whether this is part of an ongoing session between the client-server pair C and S. This is determined by checking a session inactivity timer in step 702. If the timer is currently not set, then a new session is started (step 705) by picking a new label LS for this session (from the pool of labels sent by the dispatcher for the server S). If the timer has not expired, this implies an ongoing session between C and S with a label LS that has already been allocated to this session. Since a connection for this session has just started, the timer is stopped (step 703). In either case, the proxy then sets up the connection to the server S using label LS (step 704). When the connection completes, the inactivity timer is restarted (step 707) and the proxy starts waiting for a new connection (step 701).

Another simple criterion for client affinity is to always use the same label at the forward proxy for all requests originated from a given client, without determining the start and end of sessions. In other words, the forward proxy assigns a common label to all requests from a particular client, such that each client is assigned a different label. As opposed to the two methods described above (FIGS. 6 and 7), there is no requirement for assigning labels on a per-session basis. Instead, all requests from a given client are assigned a common label. Other criteria known to those skilled in the art are used as determined by the particular application.

Figure 8:
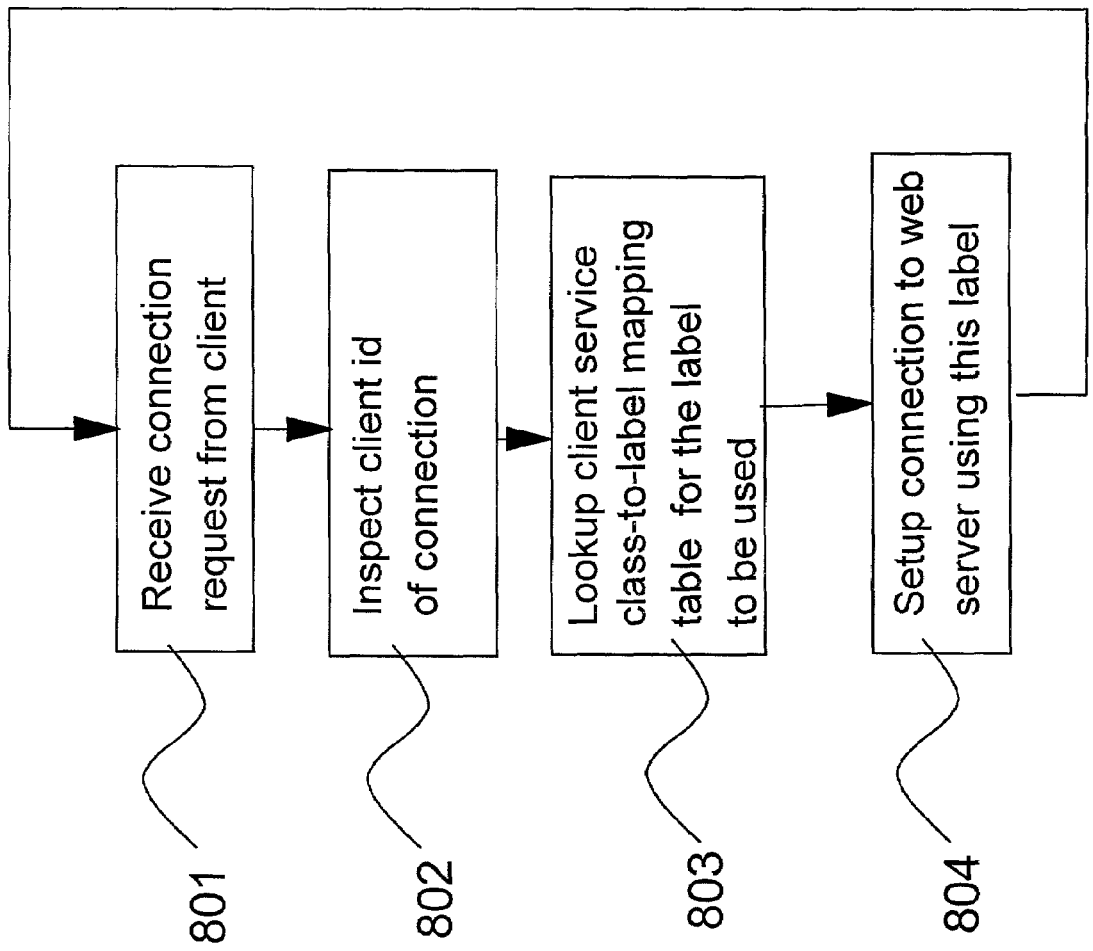
FIG. 8 is a block diagram that delineates the steps taken by the forward proxy in mapping labels to connections while maintaining timer based affinity.

FIG. 8 shows an example of how the forward proxy uses the labels received from the network dispatcher to provide service differentiation. It is often desirable to provide different classes of service based on a service differentiation criterion such as service level agreements or other administrative arrangements. The dispatcher can provide different label sets for the different classes of service. The proxy can assign labels to clients based on the type of service they require. For example, the dispatcher could provide the proxy with three prioritized labels corresponding to gold, silver, and bronze service. At the dispatcher, requests can be dispatched to servers based on the service class, with gold-labeled packets switched to the best performing server, for example. Label stacking can also be used to identify the organization and then the class within the organization to provide hierarchical classes of service. FIG. 8 describes the steps used for the forward proxy in using labels for service differentiation. The forward proxy first receives a TCP/HTTP connection from a client in step 801, determines the client id from the client's IP address or the HTTP cookie (step 802) and then inspects its client to service class label mapping table for the label matching the requested service class (step 803). It then setups a connection to the web server and uses this label on all packets constituting the said connection.

Figure 9:
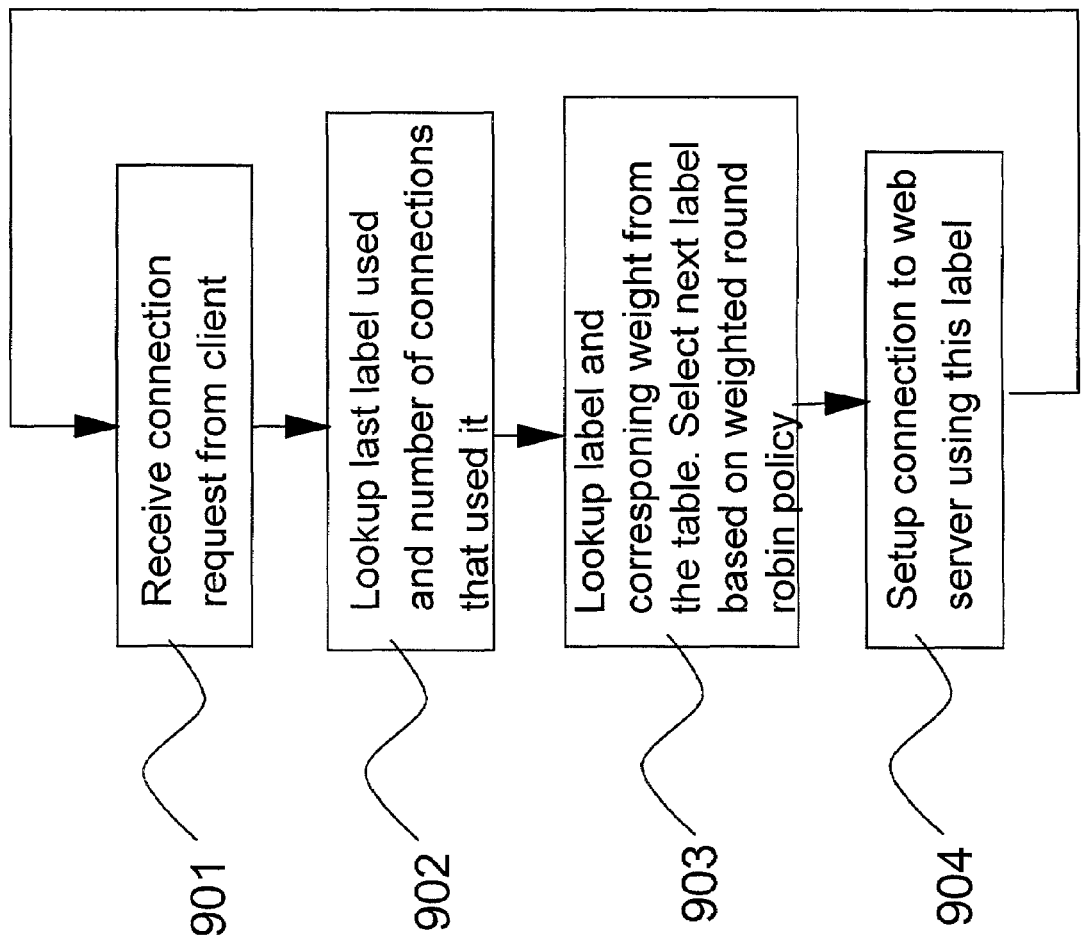
FIG. 9 is a block diagram that delineates the steps taken by the forward proxy in mapping labels to connections to provide service differentiation based on client identity.

FIG. 9 shows an example of how the forward proxy uses the labels received from the network dispatcher to implement Load Balancing. While using a load balancing criterion, the proxy assigns labels to client requests such that the load across all the servers is approximately equal, assuming that each request can be serviced by more than one (or all) servers. The dispatcher sends a list of labels to the proxy, along with an associated weight for each label and a selection policy.

For example the dispatcher could send a tuple <{(L1, w1), (L2, w2), . . . }, WRR> listing labels and their corresponding weights to be used in a weighted round robin fashion. This scheme will achieve coarse-grained (i.e., not per-connection) load balancing, but temporary load imbalances may arise from the random nature of the requests.

If a load imbalance occurs, the dispatcher can send the proxy a new set of weights for the label assignment such that incoming connections are shifted away from a heavily loaded server until the load is back within limits. In the case when a server becomes unavailable, sending a weight of zero for the corresponding label(s) implicitly removes the server from operation.

The steps in FIG. 9 shows an example in which the forward proxy first receives a TCP/HTTP connection from a client in step 901, looks up the last label used in the previous connection (step 902) and then inspects the list of labels and their corresponding weights mapping table (step 903) and selects the next label based on the weights in a weighted round-robin fashion. It then setups a connection to the web server and uses this label on all packets constituting the said connection.

It is worth noting that providing client affinity and load balancing together requires some additional consideration. If the dispatcher wishes to correct a load imbalance with a new set of labels, the proxy continues to use the old label set for all ongoing sessions. Only when they complete can the proxy transition to use the new label set. In the interim new client sessions may be initiated using the new labels.

Figure 10:
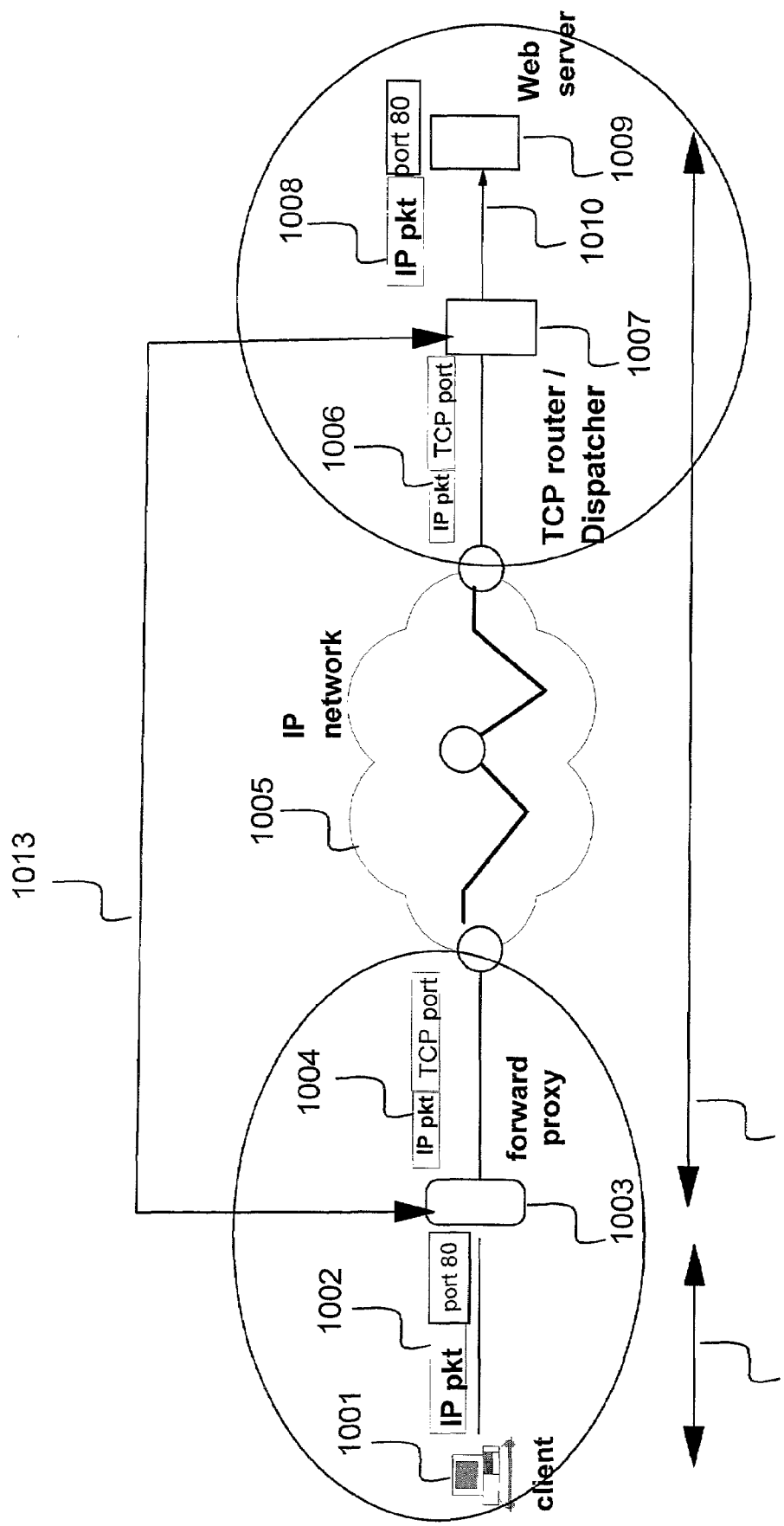
FIG. 10 is a block diagram that delineates the steps taken by the forward proxy in mapping labels to connections to provide load balancing using weighted round robin.

The benefits of MPLS-based request-routing can be fully realized only after the conditions described above are satisfied. Our proposed scheme can, however, be decoupled from MPLS by viewing it simply as a scheme to encode application layer information in lower-layer network headers. This is described in FIG. 10. In the case of MPLS, we map higher information onto MPLS labels. Instead, we could encode this information about the connection onto the transport layer or network layer in port numbers or IP addresses, respectively. For instance, rather than distributing labels to the proxy, the dispatcher can distribute port numbers along with corresponding URL paths to achieve content routing. At the server-side, a layer-4 dispatcher could examine the port number in the incoming TCP header and direct the packet to the appropriate server without having to terminate the connection. As shown in FIG. 10, the client 1001 establishes a TCP/HTTP connection 1012 with the forward proxy 1003, typically on TCP port number 80, as shown in item 1002. The forward proxy examines the URL being requested and maps the request to a pre-defined TCP port. This mapping is communicated to the forward proxy on a control connection 1013. The TCP/HTTP packets 1004 between the forward and reverse proxies are sent on this predefined port. At the TCP router/dispatcher 1007, the IP address and the port number of the incoming packet 1006 is replaced with the IP address and port 80 of the web server 1009 that will serve the requested content. The resulting packet 1008 is sent on the link 1010 towards the server 1009. Note that port 80 is generally used for HTTP access and therefore, this was the port number used on the packets on the client link 1012 and the server link 1010.

An example of an apparatus which implements the forward proxy system is shown in FIG. 11a. The forward proxy 1101 in the figure includes of four primary components. The HTTP proxy 1102 handles standard proxy functionality including receiving Web requests from clients and making corresponding connections to the appropriate server. The label map and label communicator module 1105 receives request-to-label mappings from the reverse proxy, perhaps via a persistent connection as shown in FIG. 2, (217). It stores the request-to-label mappings in a local database. The request inspector module 1103 is responsible for examining the client request and choosing the appropriate label for use in the connection, based on the content being requested or the client identity, for example. The label applicator 1104 applies the chosen label on each outgoing packet of the client connection to enable content-aware web switching at the dispatcher. In the case of the second embodiment using TCP port numbers, the labels described above should be understood to mean TCP port numbers. That is, the label map and label communicator modules would store TCP port number mappings and communicate request-to-port number mappings, respectively. The label applicator would initiate the connection with the appropriate local TCP port number.

An apparatus which implements the reverse proxy or dispatcher system is shown in FIG. 11b. The forward proxy 1105 in the figure includes of four primary components. The label programming interface 1110 provides an interface to the proxy to program the label mapping table 1111 in the dispatcher. The label switching table 1111 determines how to switch or route an incoming packet with a given label to the appropriate output interface. The label communicator 1109 sends label mappings to the forward proxy to inform it of what label to apply for different client requests. The communicator may use a persistent TCP connection for this purpose. The label receiver/inspector 1107 examines the label on incoming packets, consults the label switching table, and chooses the corresponding output interface to forward the packet. The packet switch 1108 sends the packet to the chosen output interface of the dispatcher based on the decision made by the label inspector. In the case where the dispatcher is a standard MPLS switch, the label inspector, label switching table, and packet switcher are implemented in hardware for high-performance packet switching. In our alternate embodiment using TCP port numbers, the label communicator sends port number mappings to the forward proxy and the label programming interface provides a means to install a port number switching table analogous to the label switching table. Similarly, the label inspector examines port numbers on incoming packets to make the forwarding decision.

The present invention can be realized in hardware, software, or a combination of hardware and software. It may be implemented as a method having steps to implement one or more functions of the invention, and/or it may be implemented as an apparatus having components and/or means to implement one or more steps of a method of the invention described above and/or known to those skilled in the art.

A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after either or both of the following conversion to another language, code or notation, and/or reproduction in a different material form.

Thus the invention includes an article of manufacture which comprises a computer usable medium having computer readable program code means embodied therein for causing one or more functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. For example different criteria known to those skilled in the art may be used other than those described herein, and/or the non-MPLS method may be used for MPLS systems. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what we claim as new and desire to secure by Letters Patent is as follows:

1. A method comprising:
applying a particular label for content aware Web switching to packets comprising a TCP/HTTP connection from a forward proxy in front of an enterprise network, to a reverse proxy in front of a server farm network, said enterprise network having at least one client, said particular label being based on content to enable content-based switching, including the steps of:
forming a communication channel between the forward proxy and the reverse proxy;
sending upon said communication channel a mapping of at least one stacked MPLS label from the reverse proxy to the forward proxy; and
said forward proxy:
inspecting each request received from each client from said at least one client; and
assigning the particular label to all outgoing packets comprising the TCP/HTTP connection generated to serve the request to an appropriate server in the server farm network;
said reverse proxy:
reading said particular label on all incoming packets;
identifying content requested; and
based on said content switching said incoming packets to the appropriate server within said server farm while maintaining transport layer connections.

2. A method as recited in claim 1, where the step of inspecting is performed on an HTTP header.

3. A method as recited in claim 1, where the step of applying is employed in accordance with a URL of content being requested, and in accordance with said mapping.

4. A method as recited in claim 3, wherein said mapping is a mapping of URLs to MPLS labels.

5. A method as recited in claim 1, wherein the server farm network is MPLS enabled and the step of switching includes employing an MPLS switch as the reverse proxy.

6. A method as recited in claim 1, wherein the server farm network is not MPLS enabled and the step of reading includes:
receiving an incoming packet having an incoming label;
identifying a corresponding outgoing port and outgoing IP address based on the incoming label in said incoming packet;
removing said incoming label and encapsulating said incoming packet with said outgoing IP address in forming an encapsulated packet; and
forwarding said encapsulated packet on said outgoing port.

7. A method as recited in claim 1, wherein the step of reading includes:
receiving an incoming packet having an incoming label;
identifying a corresponding outgoing port and outgoing Ethernet medium access control (MAC) address based on the incoming label in said incoming packet;
replacing said incoming label with said MAC address; and
forwarding said incoming packet having said MAC address on said outgoing port.

8. A method as recited in claim 1, where the step of applying is employed in accordance with a load balancing criterion.

9. A method as recited in claim 8, wherein said mapping is a label listing.

10. A method as recited in claim 1, where the step of applying is employed in accordance with a service differentiation criterion.

11. A method as recited in claim 10, wherein said mapping is one or more prioritized labels.

12. A method as recited in claim 1, where the step of applying is employed in accordance with a client affinity criterion.

13. A method as recited in claim 12, wherein said mapping is a label listing, and said forward proxy assigning a common label to all requests from a particular client, such that each client is assigned a different label.

14. An apparatus comprising:
means for applying a particular label to packets comprising a TCP/HTTP connection from a forward proxy in front of an enterprise network, to a reverse proxy in front of a server farm network, said enterprise network having at least one client, said particular label being based on content to enable content-based switching, said means for applying including:
means for forming a communication channel between the forward proxy and the reverse proxy;
means for sending upon said communication channel a mapping of at least one MPLS label to future requested content from the reverse proxy to the forward proxy; and
said forward proxy having:
means for inspecting each request received from each client from said at least one client; and
means for assigning the particular label to all outgoing packets comprising the TCP/HTTP connection generated to serve the request to an appropriate server in the server farm network;
said reverse proxy having:
means for reading said particular label on all incoming packets; and
means for identifying content requested;
means for switching based on said content said incoming packets to the appropriate server within said server farm, while maintaining transport layer connectivity.

15. A method comprising:
while maintaining transport layer connectivity, applying a particular label to packets comprising a TCP/HTTP connection from a forward proxy in front of an enterprise network, to a reverse proxy in front of a server farm network, said particular label being based on content, said enterprise network having at least one client, including the steps of:
forming a communication channel between the forward proxy and the reverse proxy;
sending upon said communication channel a mapping of at least one MPLS label from the reverse proxy to the forward proxy; and
said forward proxy:
inspecting each request received from each client from said at least one client; and
assigning the particular label to all outgoing packets comprising the TCP/HTTP connection generated to serve the request to an appropriate server in the server farm network, wherein all dissemination of labels is according to different attributes, including application layer attributes.

16. A method comprising:
forming a communication channel between a forward proxy and a reverse proxy, said forward proxy being in front of an enterprise network, and said reverse proxy being in front of a server farm network, the reverse proxy reading a particular label on all incoming packets, said particular label being based on content to enable content-based switching, and based on said content switching said incoming packets to an appropriate server within the server farm network, while maintaining transport layer connectivity, wherein the forward proxy:

applying the particular label to packets comprising a TCP/HTTP connection from the forward proxy to the reverse proxy, said enterprise network having at least one client, sent upon said communication channel a mapping of at least one MPLS label from the reverse proxy to the forward proxy;

inspecting each request received from each client from said at least one client; and identifying content requested;

assigning the particular label to all outgoing packets comprising the TCP/HTTP connection generated to serve the request to the appropriate server in the server farm network.

17. A method comprising:

while maintaining transport layer connectivity, applying a specific port to packets comprising a Web request on a TCP/HTTP connection from a forward proxy in front of an enterprise network, said enterprise network having at least one client, to a reverse proxy in front of a server farm network, including the steps of:

forming a communication channel between the forward proxy and the reverse proxy;

sending upon said communication channel a mapping of at least one TCP Port number from the reverse proxy to the forward proxy; and said forward proxy:

inspecting each request received from each client from said at least one client; and assigning said TCP port number to all outgoing packets comprising the TCP/HTTP connection generated to serve the request to an appropriate server in the server farm network;

said reverse proxy:

reading said TCP port number on all incoming packets; and replacing the TCP port number and IP address of the incoming packet with a port number of HTTP server and IP address of an appropriate server.

18. A method as recited in claim 17, where the step of inspecting is performed on an HTTP header.

19. A method as recited in claim 17, where the step of applying is employed in accordance with a URL of content being requested, and in accordance with said mapping.

20. A method as recited in claim 19, wherein said mapping is a mapping of URLs to TCP port numbers.

21. A method as recited in claim 17, where the step of applying is employed in accordance with a load balancing criterion.

22. A method as recited in claim 21, wherein said mapping is a listing of TCP port numbers.

23. A method as recited in claim 17, where the step of applying is employed in accordance with a service differentiation criterion.

24. A method as recited in claim 23, wherein said mapping is one or more prioritized TCP port numbers.

25. A method as recited in claim 17, where the step of applying is employed in accordance with a client affinity criterion.

26. A method as recited in claim 25, wherein said mapping is a listing of TCP port numbers, and said forward proxy assigning a common TCP port number to all requests from a particular client, such that each client is assigned a different TCP port number for all connection requests from said each client.

27. A method comprising:

using MPLS labels for web switching, including the steps of:

obtaining a set of labels at a forward proxy wherein each client Web request is mapped to a set of labels, said labels being based on content;

applying a stack of said set of labels on packets comprising said client Web requests at said forward proxy; and based on said content switching said packets at the reverse proxy based on said label stack, while maintaining transport layer connectivity.

28. A method as recited in claim 27, further comprising obtaining from the reverse proxy or an agent of the reverse proxy said set of labels through a communication channel between said forward proxy and said reverse proxy, or through an agent of said reverse proxy.

29. A method as recited in claim 28, wherein said agent is a specialized label distribution server.

30. A method as recited in claim 27, further comprising embedding said set of labels in a URL (Uniform Resource Locator) of said client Web requests, and the step of obtaining includes extracting said set of labels from said URL.

31. A method as recited in claim 27, further comprising applying said stack of labels in accordance with a URL of said client Web requests.

32. A method as recited in claim 27, further comprising applying said stack of labels in accordance with an identity of a client making said client Web request.

33. A method as recited in claim 27, further comprising applying said stack of labels in accordance with client session affinity criterion.

34. A method as recited in claim 27, further comprising applying said stack of labels in accordance with load distribution criterion.

35. An apparatus serving as a forward proxy comprising:

traditional forward proxy modules comprising:

an HTTP proxy module which receives client Web requests, and can make connections to Web servers on behalf of clients, and a request inspector module to inspect said requests;

further comprising:

a label map which includes a mapping of client request to label or TCP port number;

a set of labels wherein each client Web request is mapped to a set of labels, each of said labels being based on content;

a label communicator module which receives said mapping from a reverse proxy and stores it in the label map;

a label applicator module which applies a label stack to packets belonging to said requests in forming labeled requests;

a means for forwarding said labeled packets to the reverse proxy, while maintaining transport layer connectivity.

36. A method comprising:

using MPLS labels for web switching, including the steps of:

encoding the set of labels in URLs (Uniform Resource Locators) embedded in Web pages sent to clients from Web servers extracting said set of labels in said URLs from client Web requests at a forward proxy, each of said labels being based on content;

applying said set of labels on packets comprising said client Web requests at said forward proxy; and switching said packets at the reverse proxy based on said set of labels, while maintaining transport layer connectivity.

37. A method comprising:

using TCP port numbers for web switching including the steps of:

obtaining a set of port numbers at the forward proxy for use with client Web requests;

using a port number from the said set of port numbers on packets comprising said client requests at said forward proxy based on content; and switching said packets at the reverse proxy based on said port number by replacing the IP address and said port number with a new IP address and port number, while maintaining transport layer connectivity.

38. A method as recited in claim 37, further comprising obtaining from the reverse proxy or an agent of the reverse proxy said set of port numbers through a communication channel between said forward proxy and said reverse proxy, or between said forward proxy and an agent of said reverse proxy.

39. A method as recited in claim 37, further comprising embedding said set of port numbers in a URL of said client Web requests, and extracting said set of labels from said URL.

40. A method as recited in claim 37, further comprising applying said port number in accordance with a URL of said client Web requests.

41. A method as recited in claim 37, further comprising applying said port number in accordance with an identity of the client making said client Web request.

42. A method as recited in claim 37, further comprising applying said port number in accordance with a criterion to maintain client session affinity.

43. A method as recited in claim 37, further comprising applying said port number in accordance with a load distribution criterion.

44. An article of manufacture comprising a computer usable medium having computer readable program code means embodied therein for causing application of at least one label, the computer readable program code means in said article of manufacture comprising computer readable program code means for causing a computer to effect the steps of claim 1.

45. An article of manufacture comprising a computer usable medium having computer readable program code means embodied therein for causing application of a particular label, the computer readable program code means in said article of manufacture comprising computer readable program code means for causing a computer to effect the steps of claim 15.

46. An article of manufacture comprising a computer usable medium having computer readable program code means embodied therein for causing switching of packets based on labels, the computer readable program code means in said article of manufacture comprising computer readable program code means for causing a computer to effect the steps of claim 16.

47. An article of manufacture comprising a computer usable medium having computer readable program code means embodied therein for causing application of a specific port to packets, the computer readable program code means in said article of manufacture comprising computer readable program code means for causing a computer to effect the steps of claim 17.

48. An article of manufacture comprising a computer usable medium having computer readable program code means embodied therein for causing application of a stack of said labels on packets, the computer readable program code means in said article of manufacture comprising computer readable program code means for causing a computer to effect the steps of claim 27.

49. An article of manufacture comprising a computer usable medium having computer readable program code means embodied therein for causing use of TCP port numbers for web switching, the computer readable program code means in said article of manufacture comprising computer readable program code means for causing a computer to effect the steps of claim 37.

50. A computer program product comprising a computer usable medium having computer readable program code means embodied therein for causing application of a particular label, the computer readable program code means in said computer program product comprising computer readable program code means for causing a computer to effect the functions of claim 14.

51. A computer program product comprising a computer usable medium having computer readable program code means embodied therein for causing a proxy to serve as a forward proxy, the computer readable program code means in said computer program product comprising computer readable program code means for causing a computer to effect the functions of claim 35.

52. A computer program product comprising a computer usable medium having computer readable program code means embodied therein for causing a proxy to serve as a reverse proxy, the computer readable program code means in said computer program product comprising computer readable program code means for causing a computer to effect the functions of claim 36.

53. A method as recited in claim 1, wherein:

the step of inspecting is performed on an HTTP header;

the step of applying is employed in accordance with a URL of content being requested, and in accordance with said mapping;

said mapping is a mapping of URLs to MPLS labels;

the server farm network is MPLS enabled and the step of switching includes employing an MPLS switch as the reverse proxy;

the server farm network is not MPLS enabled and the step of reading includes: receiving an incoming packet having an incoming label; identifying a corresponding outgoing port and outgoing IP address based on the incoming label in said incoming packet; removing said incoming label and encapsulating said incoming packet with said outgoing IP address in forming an encapsulated packet; and forwarding said encapsulated packet on said outgoing port; and the step of applying is employed in accordance with one of a load balancing criterion, a service differentiation criterion, and a client affinity criterion.

* * * * *